271-9 SR
11/11/86 OR RE 32,281

United States Patent [19]

Tsubo

[11] E Patent Number: Re. 32,281

[45] Reissued Date of Patent: Nov. 11, 1986

[54] COPY SHEET-FEEDING APPARATUS

[75] Inventor: Shuzo Tsubo, Kawasaki, Japan

[73] Assignee: Tokyo Shibaura Denki Kabushiki Kaisha, Kawasaki, Japan

[21] Appl. No.: 608,277

[22] Filed: May 8, 1984

Related U.S. Patent Documents

Reissue of:

[64] Patent No.: 4,332,375
Issued: Jun. 1, 1982
Appl. No.: 145,878
Filed: May 1, 1980

[30] Foreign Application Priority Data

| | | | |
|---|---|---|---|
| May 10, 1979 | [JP] | Japan | 54-57406 |
| May 10, 1979 | [JP] | Japan | 54-57407 |
| May 10, 1979 | [JP] | Japan | 54-57408 |
| May 10, 1979 | [JP] | Japan | 54-57411 |
| May 10, 1979 | [JP] | Japan | 54-57412 |
| May 10, 1979 | [JP] | Japan | 54-57416 |

[51] Int. Cl.[4] ..... B65H 1/04; B65H 1/12

[52] U.S. Cl. ..... 271/9; 271/127; 271/155; 271/157; 271/160

[58] Field of Search ..... 271/9, 147, 152, 153, 271/154, 155, 157, 160, 162, 163, 164, 171, 126, 127, 117, 118, 156, 158, 159; 355/14 R

[56] References Cited

U.S. PATENT DOCUMENTS

| | | | |
|---|---|---|---|
| 2,894,745 | 7/1959 | Holmes et al. | 271/147 |
| 3,301,551 | 1/1967 | Cassano et al. | 271/157 X |
| 3,378,254 | 4/1968 | Eichorn | 271/155 |
| 3,764,129 | 10/1973 | Yanagawa | 271/156 |
| 3,768,806 | 10/1973 | Reehil | 355/14 R X |
| 3,977,666 | 8/1976 | Suzuki et al. | 271/160 X |
| 4,061,328 | 12/1977 | Fujimoto et al. | 271/121 X |
| 4,273,323 | 6/1981 | Kaneko et al. | 271/155 X |

FOREIGN PATENT DOCUMENTS 2263490 7/1973 Fed. Rep. of Germany .

*Primary Examiner*—Bruce H. Stoner, Jr.
*Assistant Examiner*—Lawrence J. Goffney, Jr.
*Attorney, Agent, or Firm*—Cushman, Darby & Cushman

[57] ABSTRACT

A copy sheet-feeding apparatus comprises a switch and control mechanism. The switch detects an open state of a sheet cover capable of exposing a stack of copy sheet and a closed state of the cover sheet capable of enclosing the stack, and generates signals denoting the open and closed states of the sheet cover. The control mechanism controls a drive mechanism for moving a sheet rest supporting the stack of copy sheets between a first position capable of receiving the copy sheets and a second position capable of supplying the sheet to a copying press. Receiving the signal denoting the open state of the sheet cover from the switch, the control mechanism causes the sheet rest to be moved to the first position, and, receiving the signal denoting the closed state thereof, causes the sheet rest to be moved to the second position.

6 Claims, 29 Drawing Figures

COPY SHEET-FEEDING APPARATUS

Matter enclosed in heavy brackets [ ] appears in the original patent but forms no part of this reissue specification; matter printed in italics indicates the additions made by reissue.

BACKGROUND OF THE INVENTION

This invention relates to a copy sheet-feeding apparatus and more particularly to a copy sheet-feeding apparatus provided with an elevator mechanism.

An elevator type copy sheet-feeding apparatus is generally adapted for the continuous supply of a large series of copy sheets, and is usually used with an electrostatic copying press. The elevator type copy sheet-feeding apparatus includes a copy sheet rest means on which can be set a stack of about 2 to 4 times as many copy sheets (more than 1,000 sheets) as can be contained within and fed by a cassette type copy sheet-feeding apparatus. The copy sheet rest means is gradually lifted, each time a prescribed number of copy sheets are drawn off from the stack mounted thereon. This arrangement enables the uppermost copy sheet of the stack to be easily conducted to a copy sheet-feeding roller, namely to be brought to a position ready for the copying operation.

Where, with the above-mentioned elevator type copy sheet-feeding apparatus, a certain number of copy sheets have to be additionally supplied to the stack or it is necessary to take off copy sheets jammed together during the copy sheet-feeding operation, then the copy sheet-rest means is sufficiently lowered to meet such requirements. To this end, the conventional elevator type copy sheet-feeding apparatus comprises dedicated switch mounted on, for example, the control panel of said apparatus. The copy sheet rest means is brought down to a required level by the actuation of the switch.

In this case, the operator has to take two discrete steps. He must first open a copy sheet cover after lowering the copy sheet rest means. Secondly, he must pull out a copy sheet drawer, for example, to load additional copy sheets.

SUMMARY OF THE INVENTION

This invention is provided in view of the above-mentioned circumstances and is intended to provide a copy sheet-feeding apparatus of high operating efficiency which enables a copy sheet rest means to be automatically lowered to a position allowing for the supply of additional copy sheets when a copy sheet cover is opened and also to be automatically raised to a position ready for the copying operation when said copy sheet cover is closed.

According to an aspect of the present invention, there is provided a sheet-feeding apparatus which comprises:

a sheet-holding means which supports a stack of sheets and is movable between a first position capable of receiving the sheets and a second position capable of supplying the sheet;

a sheet cover which is movable between a close state capable of enclosing the stack of sheets supported by the sheet-holding means and open state capable of exposing the stack of sheets; and a drive mechanism for moving the sheet-holding means between the first position and the second position, the improvement in which comprises:

a detection mechanism which detects the open and closed states of the sheet cover, and generates signals denoting the open and closed states of said sheet cover;

a control mechanism for controlling the operation of said drive mechanism which, when receiving the signal denoting the open state of the sheet cover from the detection mechanism, causes the sheet-holding means to be moved to the first position, and, when receiving the signal denoting the closed state of the sheet cover from the detection mechanism, causes the sheet-holding means to be moved to the second position.

DETAILED DESCRIPTION OF THE PREFERRED EMBODIMENT

Description is now given with reference to the accompanying drawing of a copy sheet-feeding apparatus embodying this invention when used with, for example, an electrostatic copying press.

Figure 1:
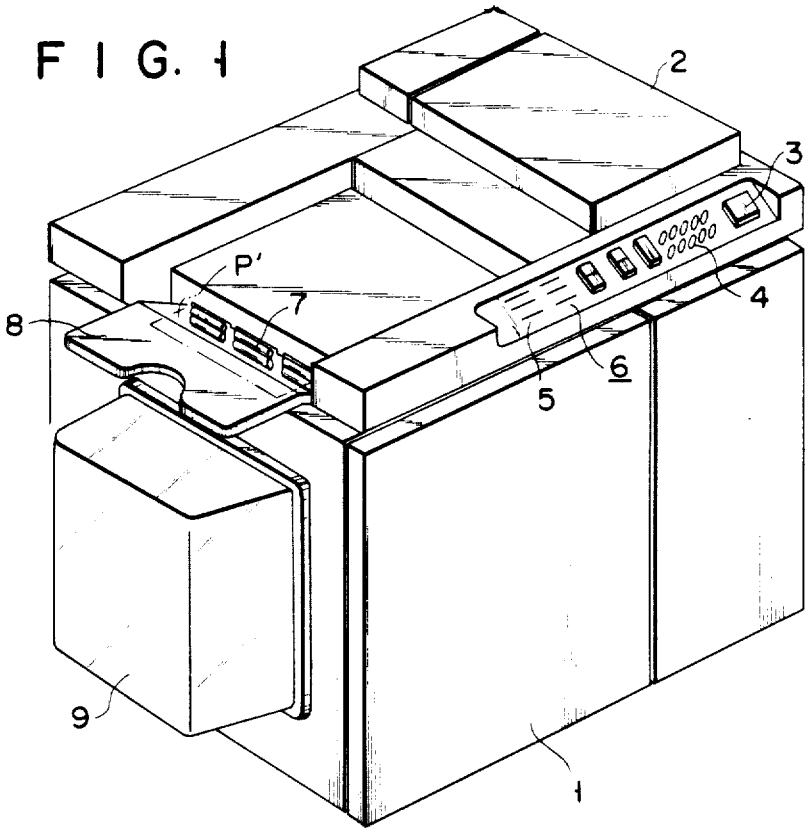
FIG. 1 is an oblique view of a copying apparatus provided with a copy sheet-feeding apparatus embodying this invention.
Figure 2:
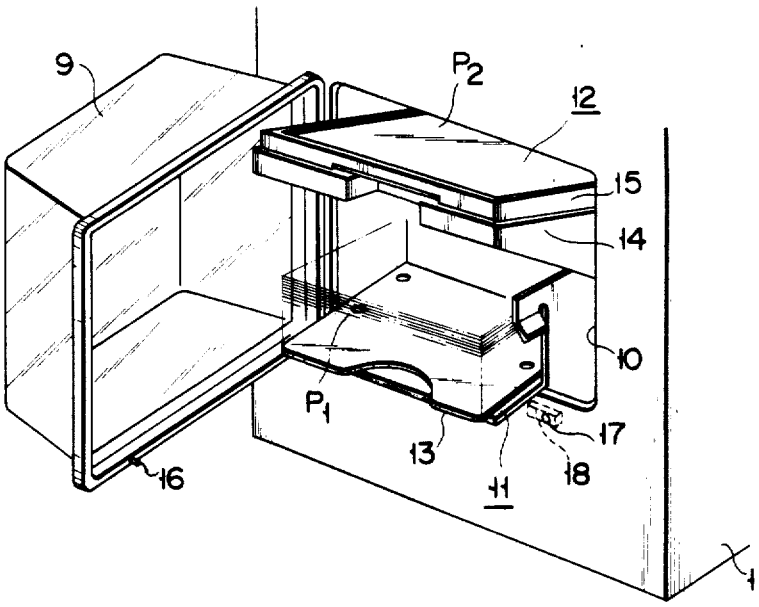
FIG. 2 is an oblique view of a copy sheet cover when opened.

FIG. 1 shows the external appearance of an electrostatic copying press 1. An original sheet table 2 is disposed on the upper right hand side of the copying press 1. A control panel 6 is set on the upper front side. Arranged on the control panel 6 are a print button 3 for commencing the copying operation of the copying press 1, a ten-key system 4 for controlling the copying operation and a display section 5 for visually informing the operator of the general condition of the copying press 1. A copy sheet discharge port 7 is provided on the upper left hand side of the copying press 1. A tray 8 for receiving a copy sheet P' drawn off through the discharge port 7 is projectively provided on the left side of FIG. 1 closely below said discharge port 7. A box-shaped cover 9 prepared from translucent material and used to protect an interior stack of copy sheets held by a copy sheet-feeding apparatus (not shown) is positioned near to center of the left hand wall of the copying press 1 in a state hinged at the rear edge as illustrated in FIG. 2.

A window 10 is formed in the central part of the left hand wall of the copying press 1. Part of an elevator type copy sheet-feeding mechanism 11 is projectively provided below the window 10. Part of a cassette type copy sheet-feeding mechanism 12 is projectively provided above the window 10. These projections are normally enclosed in the cover 9, and, where required, can be exposed.

Where the box-shaped protective cover 9 is opened, namely, when the above-mentioned projections are exposed, then a stack of copy sheets $P_1$ can be mounted on the tray of the copy sheet rest means 13 of the elevator type copy sheet-feeding mechanism. Also, a copy sheet cassette 15 can be freely set on the cassette rest 14 of the cassette type copy sheet-feeding mechanism 12 or released from said cassette rest 14. A sufficient space is provided on the tray of the copy sheet rest means 13 to hold a stack of about 1,000 copy sheets $P_1$ (for example of A4 size). Formed in the copy sheet cassette 15 is a sufficient space to hold a stack of a smaller number (for example, about 200) copy sheets having a different size, for example, B5 which may have to be often exchanged for other sizes.

Provided at the lower edge of the box-shaped copy sheet cover 9 is a projection 16 fully narrower than any of the operator's fingers. When the copy sheet cover 9 is closed, then projection 16 is directed toward the left side wall of the copying press 1. A small hole 17 which allows for the insertion of the aforesaid projection 16, but obstructs the entry of any of the operator's fingers is opened at that point of the left side wall of the copying press 1 which exactly faces said projection 16. The small hole 17 is fitted with an actuator 18a (FIG. 3) of a switch 18 for detecting the open or closed state of the copy sheet cover 9. The small hole 17 and switch 18 jointly constitute a mechanism for controlling the operation of the copy sheet cover 9. In this case, the switch 18 is operated in two different modes according as the copy sheet cover 9 is opened or closed. In other words, when receiving a signal denoting the open state of the copy sheet cover 9 from said switch 18, then the control mechanism causes the copy sheet rest means 13 to be sufficiently lowered to allow for the additional supply of copy sheets to a stack already mounted on the tray of the copy sheet rest means 13. When receiving a signal showing the closed state of the copy sheet cover 9 from said switch 18, then the control mechanism causes the copy sheet rest means 13 to be raised to a position ready for the copying operation.

The elevator type copy sheet-feeding mechanism 11 and cassette type copy sheet-feeding mechanism 12 jointly constitute a copy sheet-feeding unit in which the elevator type 11 occupies the lower section of the copying press, and the cassette type copy sheet-feeding mechanism 12 occupies the upper section. As seen from FIG. 3, a copy press-supporting base 19 is disposed in the copy press 1 itself. Right and left upright frames 21, 20 are fixedly set on the right and left sides of the upper surface of the supporting base 19. The cassette rest 14 is fixed in the upper part of a space defined between the right and left frames 21, 20. The copy sheet rest means 13 is positioned in the lower part of said space. A guide rail 23 is fitted to the outer wall of each of the right and left frames 21, 20 by means of a bracket 22. The guide rail 23 is fixedly set in place at both ends. Each guide rail 23 supports a block 24 in a vertically movable state. The crosswise edges of the rectangular base 25 of the copy sheet rest means 13 are fixed to both movable blocks 24.

The blocks 24, 24 are coupled to endless chains 29, 30 by means of brackets 31, 31 to be vertically moved with the endless chains 29, 30. The left endless chain 29 is stretched over an upper sprocket 26, lower sprocket 27 and tension sprocket 28 all rotatably fitted to the left frame 20, extending along the left guide rail 23 on the outside of the left frame 20. The right endless chain 30 is stretched over the similar sprockets rotatably fitted to the right frame 21, extending along the right guide rail 23 on the outside of the right frame 21. The right and left lower sprockets 27, 27 are engaged with both ends of a common rotatable shaft 32. A driven gearwheel 33 is fitted to the left end of said common rotatable shaft 32. The right and left lower sprockets 27, 27 and common rotatable shaft 32 are jointly driven by the rotation of the driven gearwheel 33. This driven gearwheel 33 is rotated with a driving gearwheel 36 by means of an intermediate gearwheel 37. The driving gearwheel 36 is supplied with the drive force of a reversible motor 34 through a gear box 35.

Where the reversible motor 34 is rotated in the normal or backward direction, then the right and left endless chains 29, 30 are made to run similarly in the normal direction (indicated by a solid line arrow) or backward direction (indicated by a broken line arrow). The above-mentioned gearwheels 33, 37, 36, common rotary shaft 32 and reversible motor 34 jointly constitute a chain drive mechanism 38.

The chain drive mechanism 38, and the later described mechanism 39 for detecting the allowable lowermost position of the copy sheet rest means 13, and mechanism 40 for detecting the allowable uppermost position of said copy sheet rest means 13 jointly constitute a mechanism 41 for controlling the drive of the copy sheet rest means 13. This control mechanism 41 enables the copy sheet rest means 13 to be so moved that the uppermost copy sheet $P_1$ of the stack always takes a position falling within the range in which the copy sheet can get ready for the copying operation.

A mechanism 42 for removing the uppermost copy sheet of the stack mounted on the tray of the copy sheet rest means 13 installed in the lower section of the copy sheet-feeding apparatus is set on the lower rear side of the cassette rest 14. A mechanism 43 for removing the uppermost copy sheet from the stack mounted on the cassette rest 14 positioned in the upper section of the copy sheet-feeding apparatus is provided on the upper rear side of the cassette rest 14. Provided on that side of both uppermost copy sheet-picking up mechanisms 42, 43 on which the copying operation is carried out is a timing-adjusting restart copy sheet-feeding roller 44 used in common to both mechanisms 42, 43. A drive mechanism 45 is set on the same side of the copy sheet-feeding apparatus left frame 20 to actuate the copy sheet-picking up mechanisms 42, 43 respectively provided for the upper and lower copy sheet rest means 14, 13 and the timing-adjusting restart copy sheet-feeding roller 44. An uppermost copy sheet $P_1$ or $P_2$ is selectively picked up from the stack mounted on the lower or upper copy sheet rest means 14 or 13 to the timing-adjusting restart copy sheet-feeding roller 44 when actuated by the drive mechanism 45. Thereafter, the removed copy sheet is supplied in proper timing to the electrostatic image transcription section (not shown) of the copying press 1 by the timing-adjusting restart copy sheet-feeding roller 44.

Namely, a sprocket 48 is fitted to the left end of a drive shaft 46 of the copy sheet-picking up mechanism 42 by means of a first electromagnetic clutch 53. Similarly, a sprocket 49 is fitted to the left end of a drive shaft 47 of the copy sheet-picking up mechanism 43 by means of a second electromagnetic clutch 54. A gearwheel 56 is fitted to the left end of the timing adjusting restart copy sheet-feeding roller 44 by means of a third electromagnetic clutch 57. The gearwheel 56 is engaged with a gearwheel 55 provided concentrically with a sprocket 50. An endless chain 51 is stretched over the three sprockets 48, 49, 50. This endless chain 51 is actuated by a driving sprocket 52 provided in the copying press 1 to rotate the driving shafts 46, 47 and timing-adjusting restart copy sheet-feeding roller 44.

Upon receipt of a signal instructing the feeding of a copy sheet to a copying press 1, the first or second electromagnetic clutch 53 or 54 is selectively energized to rotate the driving shaft 46 of the copy sheet-picking up mechanism 42 or the driving shaft 47 of the copy sheet-picking up mechanism 43. In either case, the third electromagnetic clutch 57 is energized in the timing in which a copy sheet is supplied to the copying press 1.

Set above the timing-adjusting restart copy sheet-feeding roller 44 is a press roller 58 which gravitationally abuts against said roller 44 in a rotatable state. A copy sheet $P_1$ or $P_2$ is supplied to the copying press 1 in a state clamped between both rollers 44, 58.

Disposed above the copy sheet-picking up mechanism 42 for the lower copy sheet rest means 13 is a push lever 60 to push up the later described mechanism 59 for lifting or releasing the copy sheet support board in the cassette 12. The later described copy sheet-detecting mechanism 61 is positioned near the copy sheet-picking up mechanism 42 for the lower copy sheet rest means 13. The later described copy sheet-detecting mechanism 62 is similarly provided near the copy sheet-picking up mechanism 43 for the upper copy sheet rest means 14.

The gear box 35 of the chain-driving mechanism 38 and reversible motor 34 are enclosed in a cover 63 provided below the lower copy sheet rest means 13. Fitted to the right side of the front wall of said cover 63 is a switch 18 for detecting the open or closed state of the previously described copy sheet cover 9. The cover 63 is set in such a position that when the lower copy sheet rest means 13 is brought to an allowable lowermost level, a space H (FIG. 3) is still left between said lower copy sheet rest means 13 and the cover 63 which is wide enough to prevent the operator's fingers from being injured, even if they happen to be put under the lower copy sheet rest means 13. A capacitor 64 is mounted on a fitting board 65 disposed below the reversible motor 34. Copy sheet size-detecting switches 66, 67 are provided on the right side of the upper surface of the cassette rest 14. The size of a copy sheet is defined by the switches 66, 67 which are rendered conducting or non-conducting by a movable member (not shown) which is provided on the underside of the copy sheet cassette 15 and whose position various with a movable guide board (not shown) of the copy sheet cassette 15.

Figure 4:
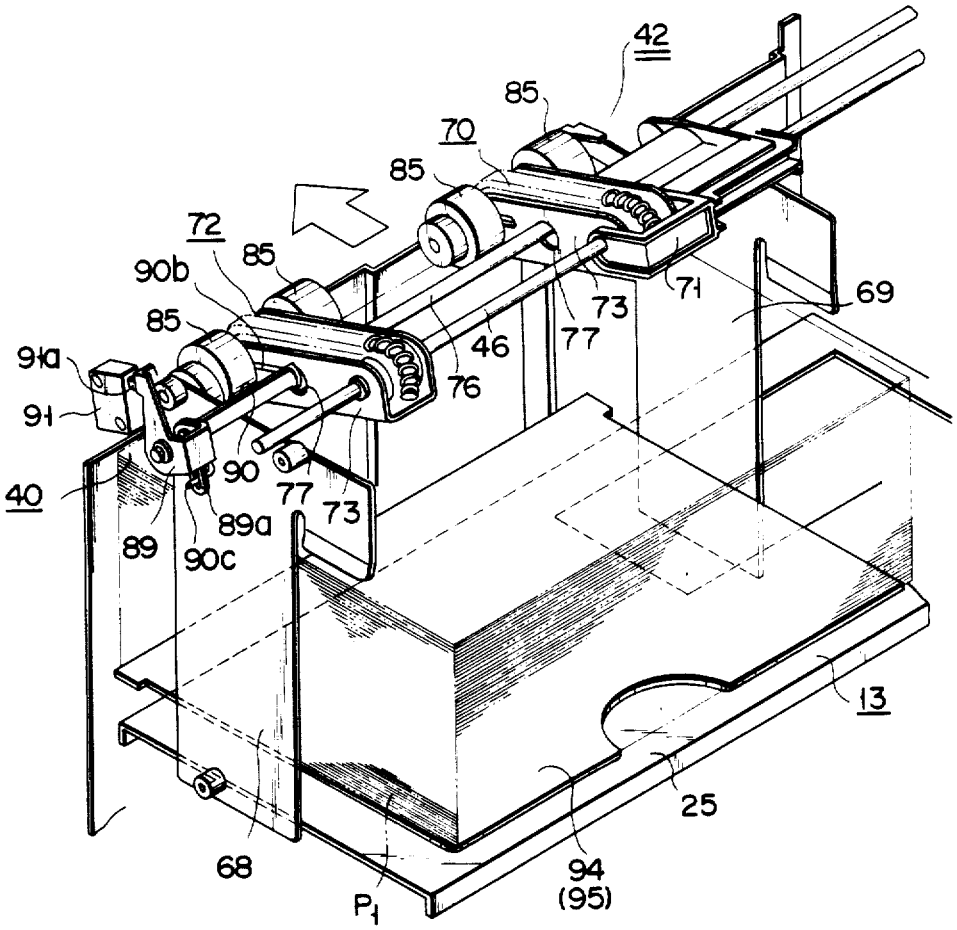
FIG. 4 is an oblique view of an uppermost copy sheet-picking up device of an elevator mechanism installed in the lower section of the copy sheet-feeding apparatus of FIG. 3.

As shown in FIG. 4, a stationary guide board 68 is provided on the left side of the passage of the lower copy sheet rest means 13, and a movable guide board 69 is positioned on the right side thereof. These guide boards 68, 69 guide both side planes of a stack of copy sheets $P_1$ superposed one above the other on the lower copy sheet rest means 13, thereby preventing both crosswise edges of the respective copy sheets from being irregularly arranged. The movable guide board 69 is connected to a copy sheet-feeding roller unit 70 disposed on the right side of the copy sheet-picking up mechanism 42 for the lower copy sheet rest means 13 by means of a coupling member 71 (FIG. 4). Where, therefore, the movable guide board 69 is shifted in conformity to the lateral length of the respective copy sheets $P_1$ superposed one above the other, then the copy sheet-feeding roller unit 70 is made to move jointly with said movable guide board 69. Therefore, a distance between the left edge of the copy sheet $P_1$ and the central line extending lengthwise of the left copy sheet-feeding roller unit 72, when perpendicularly projected from said unit 72 on the surface of the copy sheet $P_1$, is always rendered equal to a distance between the right edge of the copy sheet $P_1$ and the central line extending lengthwise of the right copy sheet-feeding roller unit 70 when perpendicularly projected from said unit 70 on the surface of the copy sheet $P_1$.

Figure 5:
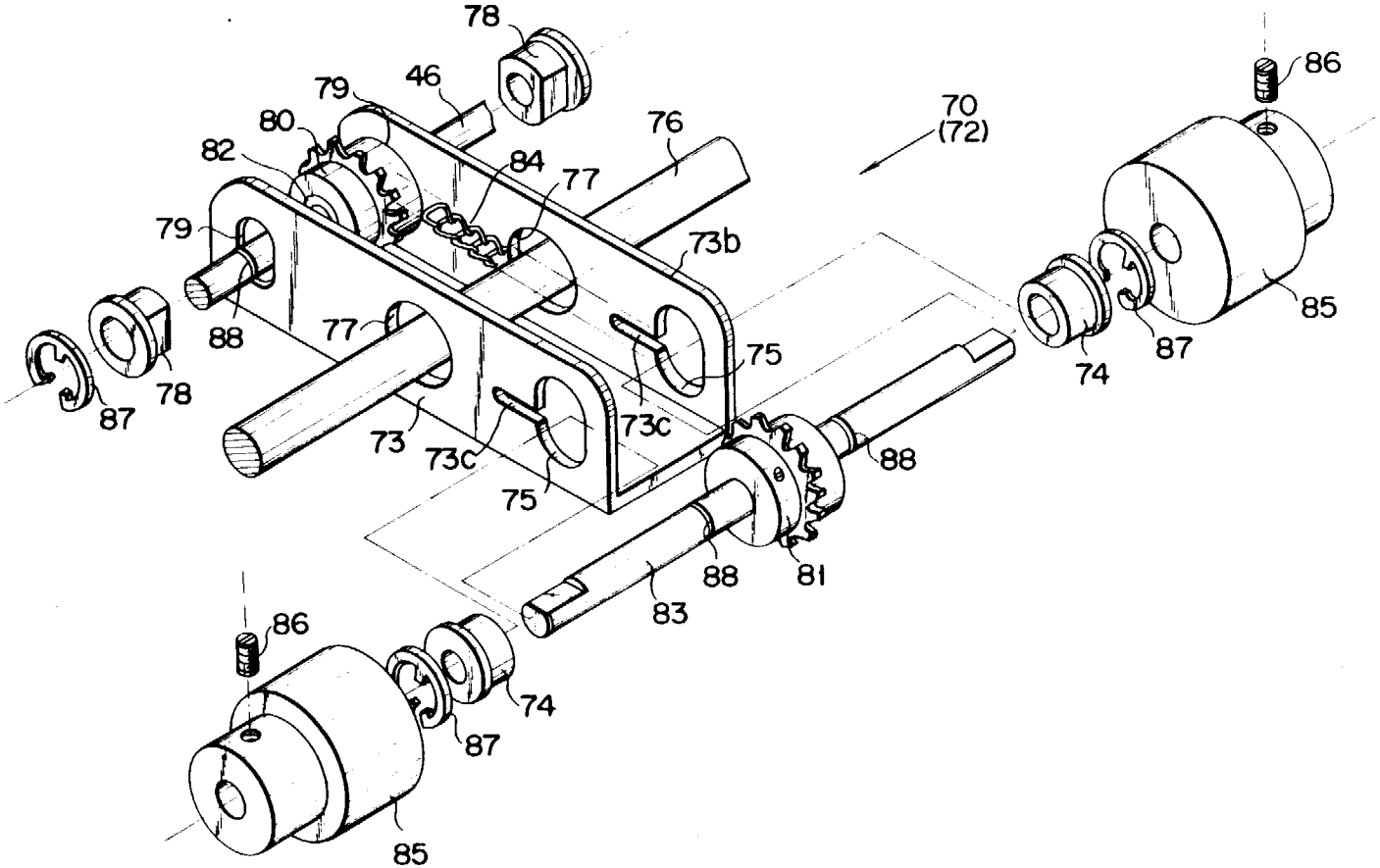
FIG. 5 is an exploded oblique view of a copy sheet roller mechanism.

The copy sheet-feeding roller unit is arranged as illustrated in FIG. 5. Namely, both upright walls 73a, 73b of a trough-shaped arm 73 are each provided with a vertically elongate hole 75 capable of vertically guiding a bush 74, a loose roller unit-locating hole 77 penetrated by a stopper shaft 76, and a hole 79 for fixedly holding a bush 78. All the holes 75, 77 and 79 are arranged in the order mentioned as counted from the rear side of the roller unit facing the copying press to the front side thereof. A driving sprocket 80 is disposed between the upright walls 73a, 73b of the trough-shaped arm 73 to face the bush-holding holes 79. A driven sprocket 81 is set between the upright walls 73a, 73b to face the bush-holding holes 75. The driving sprocket 80 is fitted to the driving shaft 46 by means of a one-way clutch 82. The driven sprocket 81 is fitted to a copy sheet-feeding roller shaft 83. The relative positions of the arm 73, driving shaft 46 and copy sheet-feeding roller shaft 83 are maintained by the bushes 74, 78. An endless chain 84 is stretched over the driving sprocket 80 and driven sprocket 81 to transmit the motive force of the driving shaft 46 to the copy sheet-feeding roller shaft 83.

A copy sheet-feeding roller 85 is fitted to both ends of the copy sheet-feeding roller shaft 83 by means of a fixing screw 86. The bushes 74, 78 are securely set in a prescribed position due to a snap ring 87 being engaged with an annular groove 88 formed in the peripheral walls of the driving shaft 46 and copy sheet-feeding roller shaft 83.

The trough-shaped arm 73 of the respective right and left copy sheet-feeding roller units 70, 72 which is constructed as described above is made swingable about the driving shaft 46, until the inner wall of the roller unit-locating hole 77 is pressed against the peripheral wall of the stopper shaft 76. The copy sheet-feeding roller shaft 83 is made vertically movable, until the bushes 74 are pressed against the upper or lower inner wall of the bush holes 75. As seen from FIG. 6A, a very small gap G is provided between the outer surfaces of the upright walls 73a, 73b of the trough-shaped arm 73 and the inner surfaces of the flanges of the bushes 74. As shown in FIG. 6B, therefore, the roller unit 70 or 72 as a whole is made swingable about the axis of the copy sheet-feeding roller shaft 83 within the range of half an angle $\alpha$ as measured upward or downward from the axis of the roller unit 70 or 72. In other words, the right half section of the roller unit 70 or 72 rises, while the left half section thereof falls. Or conversely, the right half section of the roller unit 70 or 72 falls, while the left half section thereof rises. The above-mentioned angle $\alpha$ is herein defined to mean a maximum range of swing derived from the widths of both gaps G.

Figure 7A:
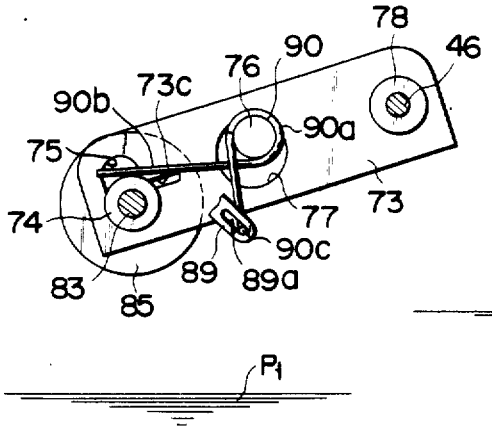
FIGS. 7A and 7B are schematic side views of the parts of a mechanism for detecting the uppermost position of the copy sheet rest assembly.
Figure 7B:
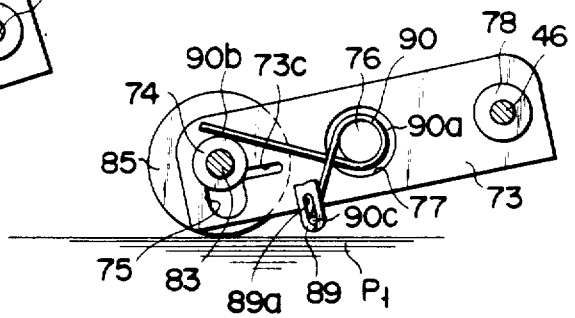

A mechanism 40 for detecting the position of the uppermost copy sheet of a stack mounted on the tray of the lower copy sheet rest means 13 is provided on the left side of the stopper shaft 76. This uppermost copy sheet position-detecting mechanism 40 comprises a roller swing-transmitting member 90, switch-actuating lever 89 and switch 91 through which a signal is sent forth to denote the detection of the position of the uppermost copy sheet of the stack (hereinafter referred to as "the uppermost position switch 91"). Fitted to the left end of the stopper shaft 76 is a member 90 (FIGS. 7A and 7B) for transmitting the extent of the vertical swing of the copy sheet-feeding roller 85 to the switch-actuating lever 89. This transmission member 90 is formed of a bent wire. The intermediate part of the wire which is bent in the circular form 90a is fitted about the stopper shaft 76, thereby enabling the transmission member 90 to be rotated about the axis of the stopper shaft 76. One end portion 90b of the transmission member 90 is abutted to the top of the bush 74. The other end portion 90c is inserted into an elongate hole 89a formed in the lower end portion of the switch-actuating lever 89 rotatably fitted to the left end of the stopper shaft 76. The upper end portion of the switch-actuating lever 89 is made to face an actuator 91a of the uppermost position switch 91 (FIG. 3) fitted to the left frame 20. Where the uppermost copy sheet $P_1$ is separated from the copy sheet-feeding roller 85 as shown in FIG. 7A, and the bush 74 rotatably supporting the copy sheet-feeding roller shaft 83 is pressed against the lower inner wall of the bush hole 75, then the actuator 91a of the uppermost position switch 91 is pressed by the switch-actuating lever 89, causing said switch 91 to be rendered conducting. Where the copy sheet-feeding roller 85 is pushed by the uppermost copy sheet $P_1$ of the stack as shown in FIG. 7B, and the bush 74 is pressed against the upper inner wall of the bush hole 75, then the swing of the copy sheet-feeding roller 85 is transmitted to the switch-actuating lever 89 by means of the transmission member 90. As a result, the switch-actuating lever 89 is rotated away from the actuator 91a of the uppermost position switch 91, which in turn is rendered nonconducting.

Figure 8:
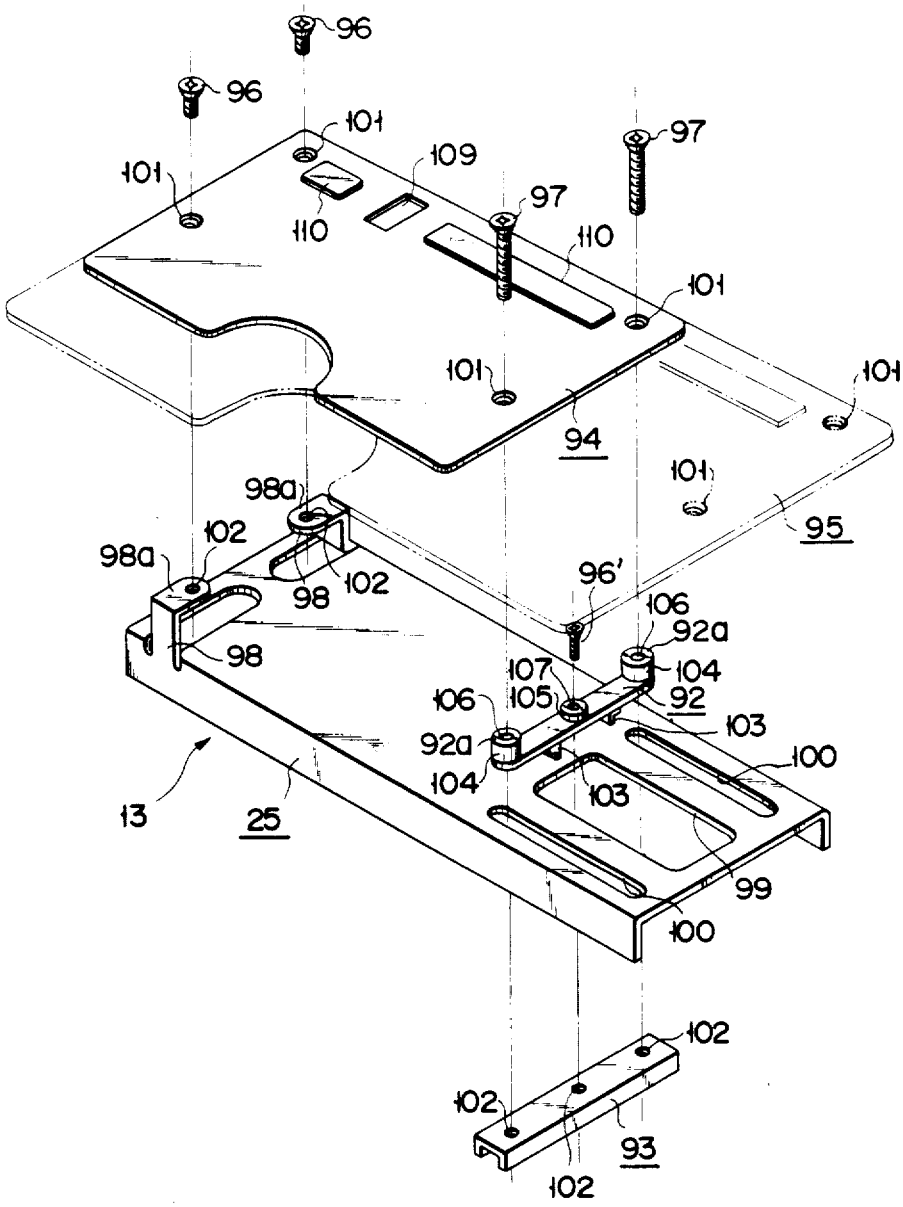
FIG. 8 is an exploded oblique view of the copy sheet rest assembly.

The lower copy sheet rest means 13 comprises, as shown in FIG. 8:

a base 25;

a spacer 92;

a press board 93;

a tray 94 or 95 which is of different size and selectively used in accordance with the size of copy sheets $P_1$ stacked one above the other; and a plurality of fitting screws 96, 97.

Tray supports 98 are provided on the front and back sides of the left end portion of the base 25. Each tray support 98 is formed of an upright cutout piece formed like an overturned L-shape. Formed in the crosswise central part of the right side of the base 25 is a rectangular window 99 extending lengthwise of said base 25 to allow for the escape of the movable copy sheet stack guide board 69 (hereinafter referred to as "the stack guide board escape window"). A pair of slits 100 extending lengthwise of the base 25 are provided along both lateral edges of the rectangular window 99. These slits 100 are penetrated by the threaded portions of the screws 97. The tray supports 98 are each provided with a tray-supporting plane 98a which is made spatially parallel with the base 25. The tray-supporting plane 98a is provided at the center with a screw hole 102, with which there is engaged the threaded portion of a fitting screw 96 passing through a screw hole 101 formed on the left side of the tray 94 or 95.

The spacer 92 is mounted on the right side of the upper surface of the base 25 in a state extending crosswise thereof. A pair of projections 103 provided on the underside of the spacer 92 are made to abut against both inner lateral walls of the rectangular stack guide board escape window 99, thereby causing the spacer 92 to be set on the base 25 in a state slidable only lengthwise of said window 99. A boss 104 is projectively mounted at both ends of the spacer 92. This boss 104 has a tray-supporting plane 92a having the same height as the tray-supporting plane 98a of the tray support 98. A boss 105 is provided at the center of the upper surface of the spacer 92 at a smaller height than the aforesaid boss 104. A screw hole 106 is formed at the center of the tray-supporting plane 92a of both bosses 104. The threaded portions of the fitting screws 97 passing through the two screw holes 101 opened on the right side of the tray 94 or 95 penetrate said screw holes 106. The threaded portions of the fitting screws 97 further pass through both screw slits 100 extending lengthwise of the base 25 and are threadedly fitted into those two of the three screw holes 102 threadedly formed in the press board 93 which are disposed at both ends of said press board 93. A screw hole 107 is formed at the center of the middle boss 105 of the spacer 92. The threaded portion of a separate fitting screw 96' passes through the stack guide board escape window 99 to be threadedly fitted into a screw hole 102 opened at the center of the narrow press board 93 disposed below the base 25. In other words, the spacer 92 and press board 93 are coupled together by the fitting screw 96' in a state slidable along the base 25 to an extend corresponding to the lateral length of the tray 94 or 95 which varies with the size of the copy sheets set in a copy sheet-feeding apparatus. The tray 94 or 95 is fitted to the base by means of the fitting screws 96, 97.

Figure 9:
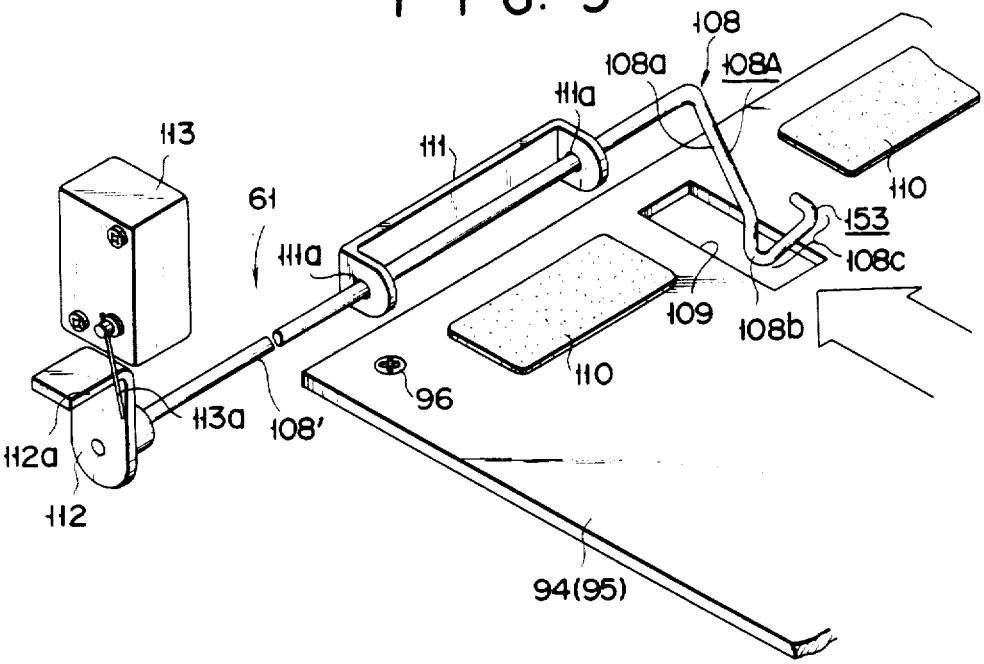
FIG. 9 is an oblique view of a mechanism for detecting the absence of copy sheets from the plate of the copy sheet rest assembly installed in the lower stage of the copy sheet-feeding apparatus, or the presence of copy sheets on said plate.

That side of the tray 94 or 95 from which a copy sheet is supplied to the copying press (not shown) is provided, as shown in FIG. 9, with a hole 109 at a point facing a detection part 108a of a detection lever 108 of the mechanism 61 for detecting the presence of copy sheets on the tray of the lower copy sheet rest means 13 or the absence of copy sheets therefrom. The hole 109 receives the detection part 108a when it is let to fall (the hole 109 is hereinafter referred to as "the detection part fall hole"). A pair of friction boards 110 extending along the lateral edge of the tray 94 or 95 are set near both sides of said detection part fall hole 109. The friction boards 110 cause the uppermost copy sheet alone to be unfailingly fed into the copying press 1 even when the stack consists of a few copy sheets.

Figure 10A:
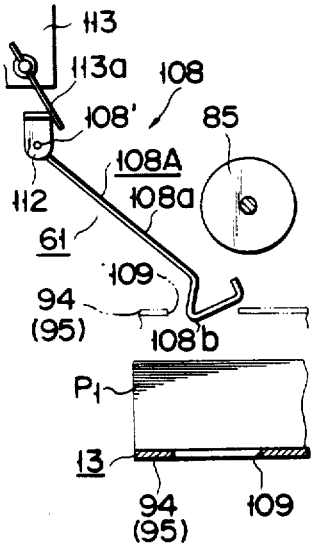
FIGS. 10A, 10B and 10C are schematic side views of the copy sheet-detecting mechanism of FIG. 9 when operated to detect the presence of copy sheets on the plate of the copy sheet rest assembly.
Figure 10B:
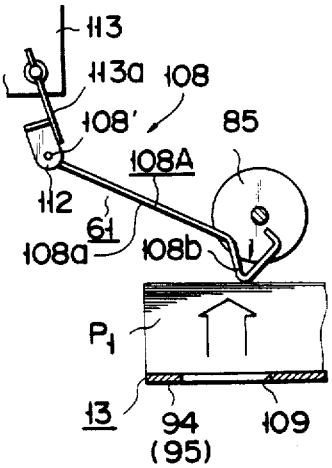
Figure 10C:
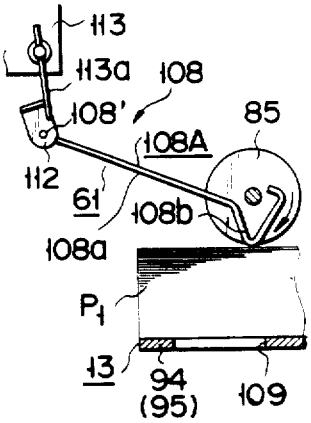

The copy sheet-detecting mechanism 61 for the lower copy sheet rest means 13 comprises, as shown in FIG. 9, the detection lever 108, detection lever holder 111, switch-actuating lever 112 and copy sheet detecting switch 113. The detection lever 108 is formed of a rigid wire and comprises a linear support section 108' and a bent detection part 108A contiguous to said support section 108'. This bent detection part 108A comprises a lever stem 108a bent from the linear support section 108' at right angles. The outer end portion of said lever stem 108a is further bent substantially in the triangular form to form a detection section 108b. The linear support section 108' rotatably penetrates a support hole 111a formed in the detection lever holder 111. The left end of the linear support section 108' is fitted with the switch-actuating lever 112, which comprises an actuator-pressing plane 112a. This actuator-pressing plane 112a is normally pressed against an actuator 113a fitted to a copy sheet-detecting switch 113. An arrow indicated in FIG. 9 shows the direction in which a copy sheet $P_1$ is supplied from the stack to the copying press. Where the lower copy sheet rest means 13 is brought downward, as seen from FIG. 10A, or cleared of all copy sheets, then the detection part 108A is rotated more clockwise through the detection part 108A fall hole 109 of the tray 94 or 95 than when a stack of copy sheets $P_1$ is mounted on the tray of the lower copy sheet rest means 13. The clockwise rotation of the detection part 108A leads to the similar large clockwise rotation of the switch lever 112. The actuator-pressing plane 112a of the switch-actuating lever 112 rotates the actuator 113a of the copy sheet-detecting switch 113 counterclockwise. Therefore, the copy sheet-detecting switch 113 is rendered non-conducting, causing a signal to be issued to denote the absence of copy sheets from the tray of the copy sheet rest means 13. Where the copy sheet rest means 13 carrying a stack of copy sheets $P_1$ is lifted, causing the uppermost copy sheet $P_1$ to abut against the detection part 108A of the detection lever 108, then the detection lever 108 is rotated about the axis of the linear support section 108'. The copy sheet-detecting switch 113 is rendered conducting, a little before the uppermost copy sheet $P_1$ touches the copy sheet-feeding roller 85 as shown in FIG. 10B, causing a signal denoting the presence of copy sheets to be sent forth. The detection lever 108 is rotated with the copy sheet-detecting switch 113 rendered conducting, until the uppermost copy sheet $P_1$ is pressed against the copy sheet feeding roller 85 with a proper pressure in a state ready for the copying operation.

Figure 11:
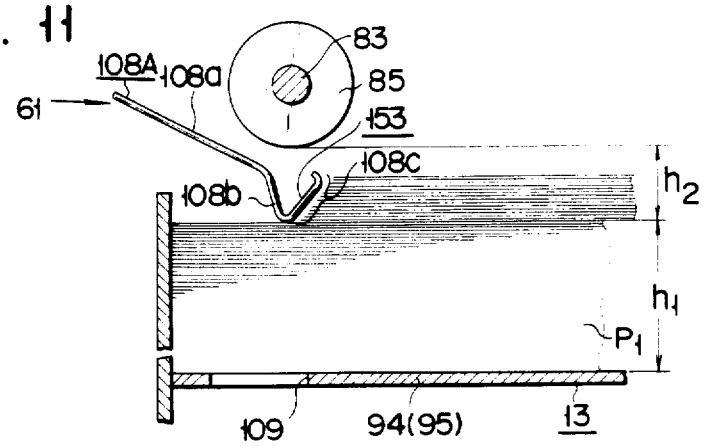
FIG. 11 is a schematic side view of the lever of the paper-detecting mechanism of FIG. 9 when actuated to limit a maximum number of copy sheets to be additionally supplied to the stack currently mounted on the plate of the copy sheet rest assembly.

As shown in FIG. 11, the base portion of the substantially triangular detection section 108b of the detection lever 108 constitutes an additional copy sheet supply-restricting stopper 108c. This stopper 108c prevents any more copy sheets than a prescribed number $h_1$ from being additionally supplied to a stack already mounted on the copy sheet rest means 13. Therefore, a required space at least as wide as $h_2$ is ensured between the bottom of the copy sheet-feeding roller 85 and the uppermost copy sheet $P_1$ of a maximum stack.

Figure 12:
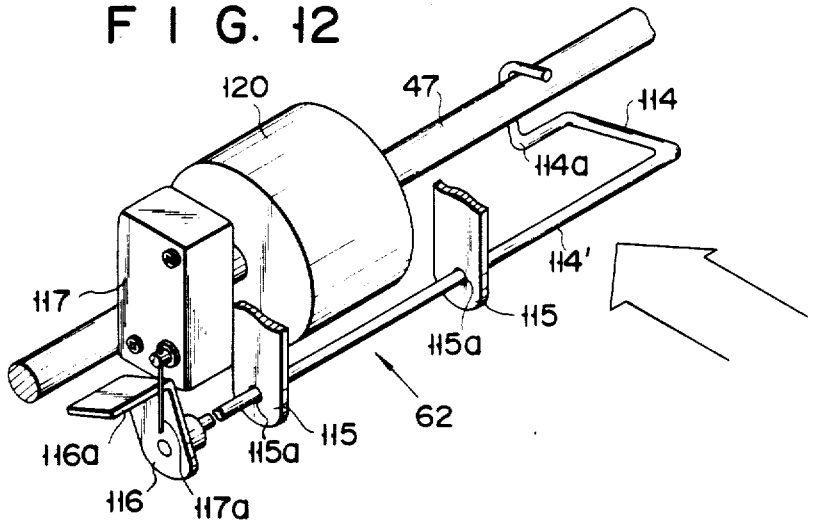
FIG. 12 is an oblique view of a mechanism installed in the upper section of the copy sheet-feeding apparatus to detect the presence of copy sheets in a copy sheet cassette or the absence of copy sheets therefrom.
Figure 13A:
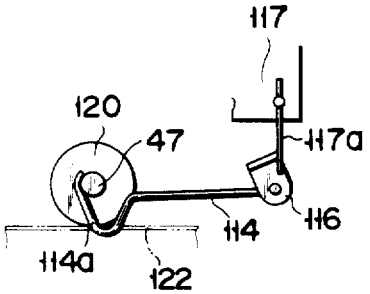
FIG. 13A is a side view of the copy sheet-detecting mechanism of FIG. 12 when actuated to detect the absence of copy sheets from the copy sheet cassette.
Figure 13B:
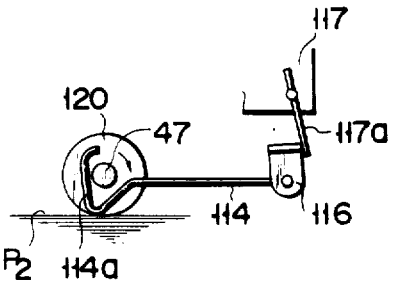
FIG. 13B is a side view of the copy sheet-detecting mechanism of FIG. 12 when operated to detect the presence of copy sheets in the copy sheet cassette.

As shown in FIG. 12, a mechanism 62 for detecting the presence of copy sheets in a cassette type copy sheet rest means disposed in the upper section of the copy sheet-feeding apparatus or the absence of copy sheets from said cassette type copy sheet rest means comprises a detection lever 114, detection lever holder 115, switch-actuating lever 116, and copy sheet-detecting switch 117. The detection lever 114 is formed of a rigid wire whose right end is bent. Provided at the right end of the detection lever 114 for the cassette type copy sheet rest means is a detection part 114a whose forward and rear sides are reversed from those of the detection part 108A of the detection lever 108 for the lower copy sheet rest means 13. A detection lever support 114' contiguous to the above-mentioned right end portion of the detection lever 108 rotatably penetrates a support hole 115a formed in the detection lever holder 115. The detection part 114a of the detection lever 114 penetrated by the drive shaft 47 can swing vertically within a prescribed range. The left end of the detection lever support 114' is fitted with a switch-actuating lever 116. An actuator-pressing plane 116a of the switch-actuating lever 116 is pressed against an actuator 117a fitted to a copy sheet-detecting switch 117. Where a cassette 15 is not loaded in a copy sheet-feeding apparatus, or a stack of copy sheets is not received in a cassette 15 already set in the copy sheet feeding-apparatus, then the detection part 114a of the detection lever 114 occupies the lowermost position as shown in FIG. 13A. As in the lower copy sheet-detecting mechanism 61, therefore, the copy sheet-detecting switch 117 is rendered nonconducting, causing a signal denoting the absence of copy sheets to be sent forth. Where at least one copy sheet $P_2$ is left in the cassette 15, then the detection part 114a of the detection lever 114 is lifted, as shown in FIG. 13B, by said copy sheet $P_2$. As a result, the copy sheet-detecting switch 117 is rendered conducting, causing a switch denoting the presence of a copy sheet to be issued. An arrow indicated in FIG. 12 shows the direction in which a copy sheet $P_2$ is supplied to the copy press (not shown).

The front underside of a stack of copy sheets $P_2$ received in the cassette 15 is supported by a copy sheet stack support board 118. This copy sheet stack support board 118 is pushed upwardly by a push lever 60 normally urged upward by a spring 119. Therefore, the uppermost copy sheet $P_2$ of a stack abuts with a proper pressure against a copy sheet-feeding roller 120 fitted to the drive shaft 47 of the copy sheet-feeding mechanism of FIG. 12. The push lever 60 is pushed on to the upper surface of the bottom board 15a of the cassette 15 or pressed below said bottom board 15a through an opening 121. A detection part fall hole 122 is formed in the copy sheet stack support board 118 at a point facing the detection lever 114 of the copy sheet-detecting mechanism 62 for the upper cassette type copy sheet rest means 14. The detection part 114a of the detection lever 114 is let to fall into said detection part fall hole 122.

Figure 3:
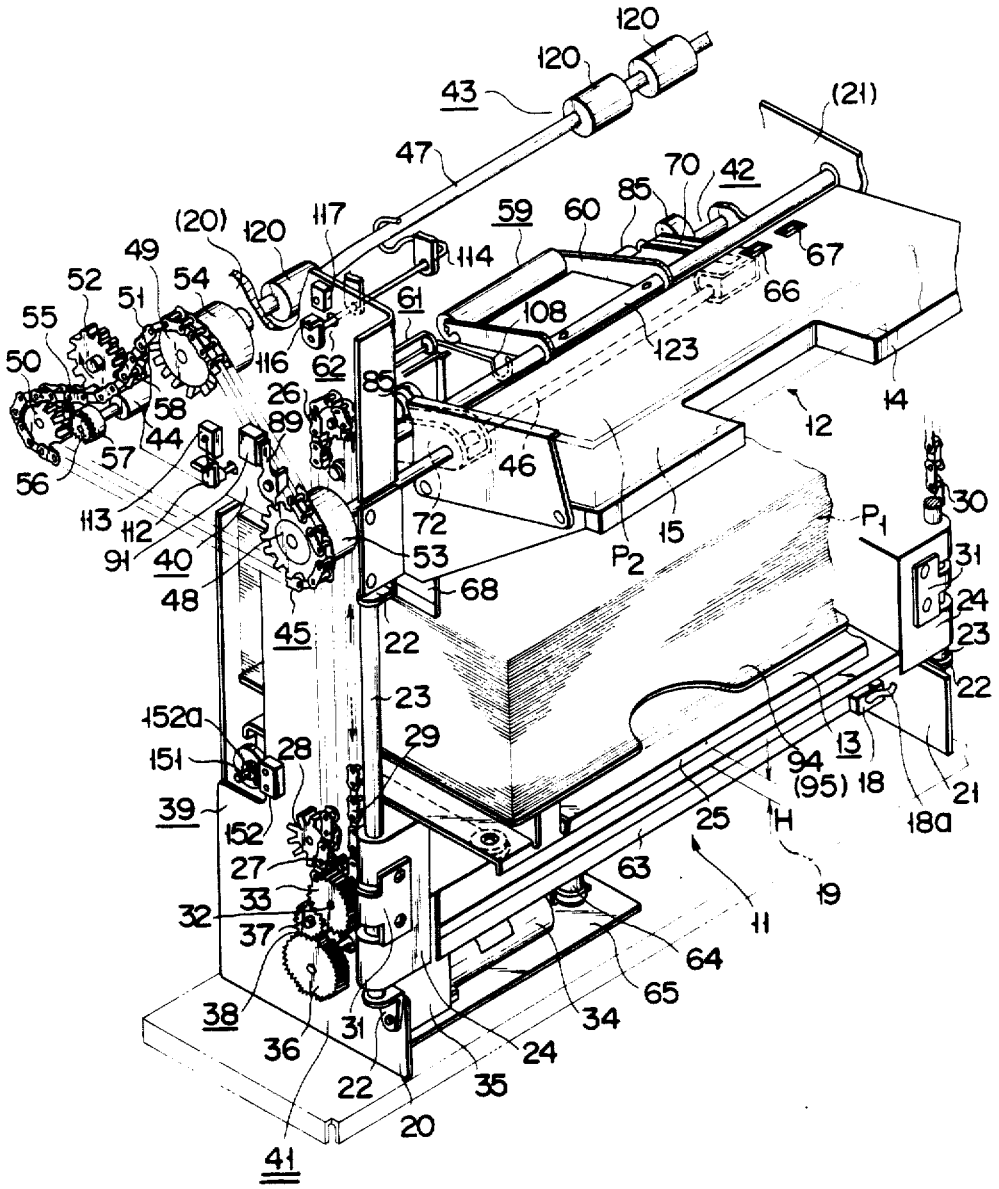
FIG. 3 is an oblique view schematically showing the arrangement of the copy sheet-feeding apparatus.

As shown in FIG. 3, the cassette type copy sheet-feeding mechanism 12 is provided with a copy sheet support board push-release mechanism 59. This push-release mechanism 59 causes the means for lifting the copy sheet support board 118 to be operated in two different modes in accordance with the vertical movement of the lower copy sheet rest means 13 resulting from the opening and closure of the copy sheet cover 9.

Figure 15:
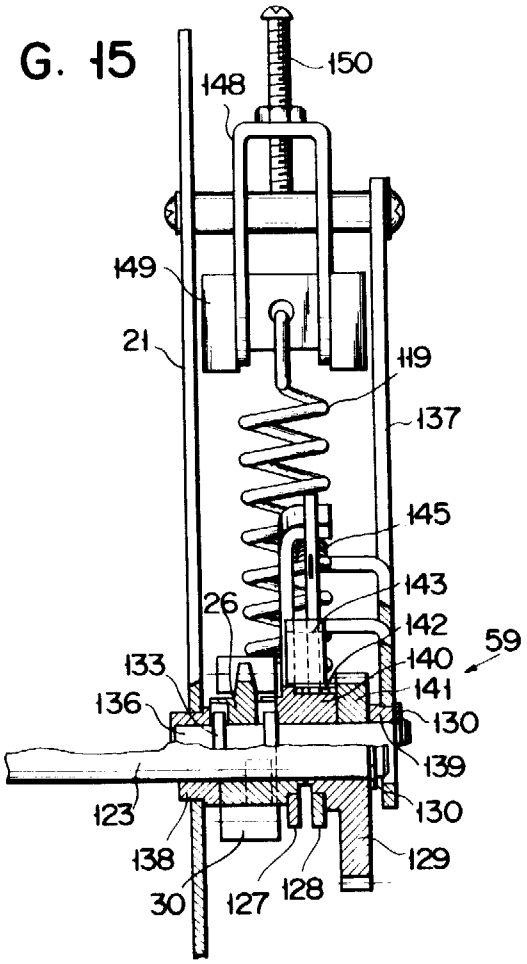
FIG. 15 is a schematic plan view, partly in section, of a mechanism for lifting and releasing the copy sheet support board.
Figure 16:
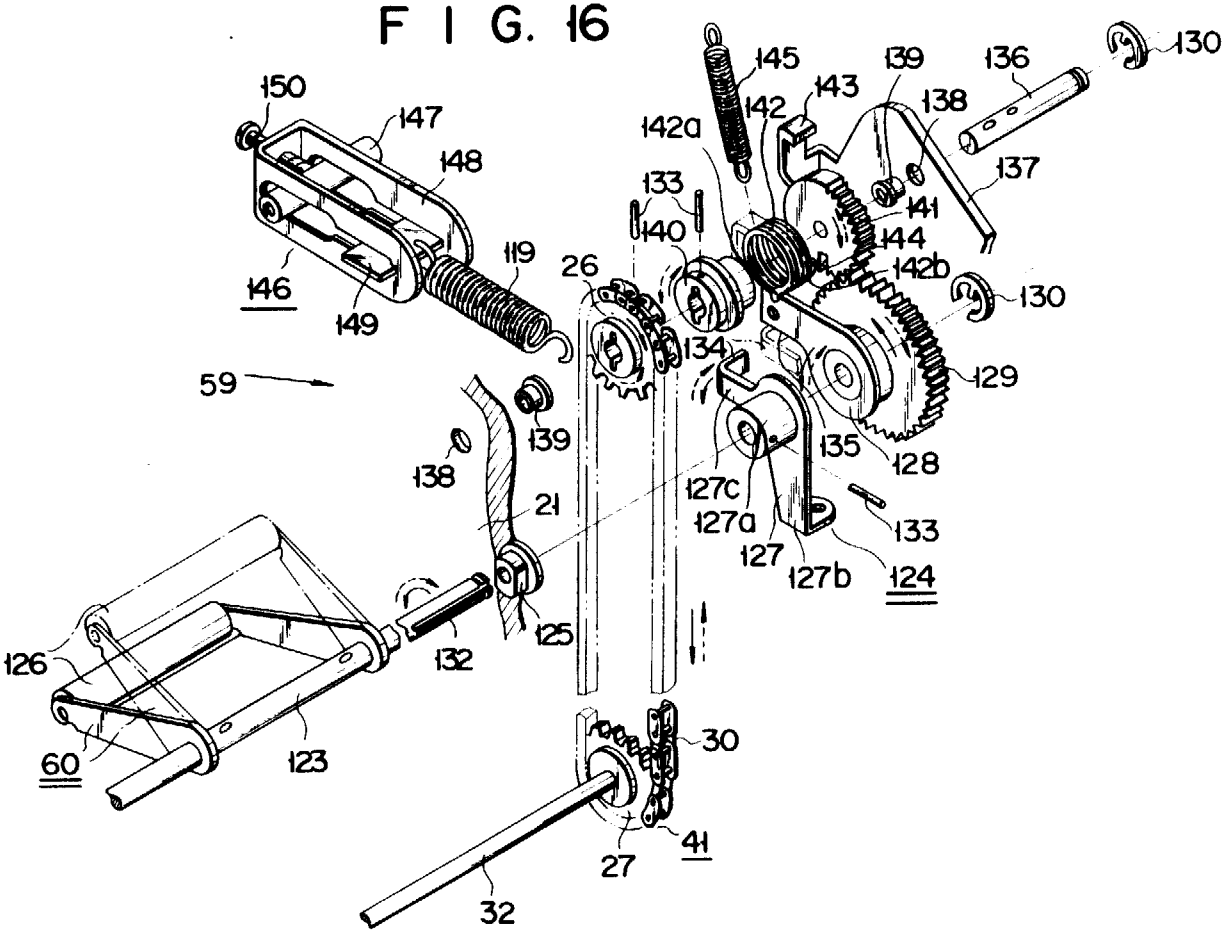
FIG. 16 is an exploded oblique view of the copy sheet support board lifting-releasing mechanism of FIG. 15.
Figure 17:
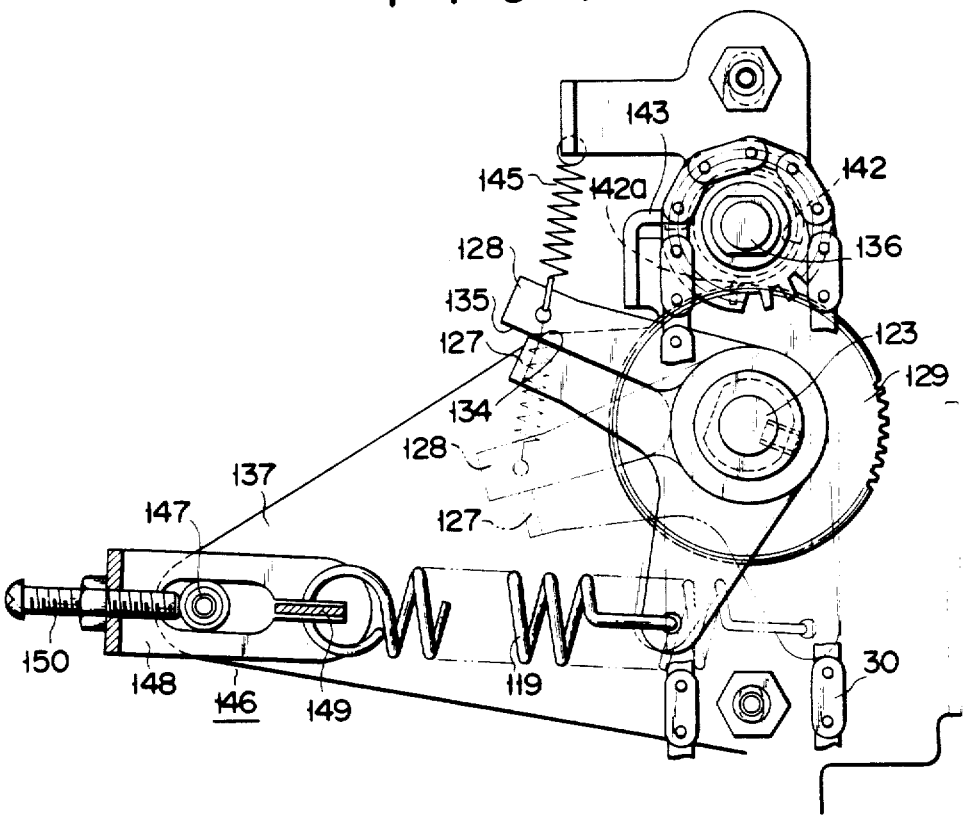
FIG. 17 is a front view of the main section of the copy sheet support board lifting-releasing mechanism of FIG. 15.

Description is now given with reference to FIGS. 15, 16 and 17 the construction and operation of the copy sheet support board push-release mechanism 59. This mechanism 59 comprises a push lever 60 and a mechanism 124 for rotating said push lever 60. The front side of the push lever 60 is fixedly set in place by a fitting shaft 123 which is rotatably fitted to the right and left frames 20, 21 in a horizontal position by means of a bush 125 (only the right one is indicated). The free end of the push lever 60 is provided with a guide roller 126 allowing for the smooth attachment and detachment between the push lever 60 and copy sheet support board 118. The right end portion of the push lever-fitting shaft 123 projects out of the right frame 21. Mounted on the right end portion of the push lever-fitting shaft 123 are a first lever 127 engaged with a spring and a gearwheel 129 integrally provided with a second lever 128 engaged with a spring, all in the order mentioned as counted from the outer wall of the right frame 21. The first lever 127 and gearwheel 129 including the second lever 128 are prevented from falling off the right end portion of the push lever-fitting shaft 123 by means of a snap ring 130. Formed in the surface of the right end portion of the push lever-fitting shaft 123 is an axially extending groove 132 with which a pin 133 is engaged. This pin 133 crosswise penetrates the engagement shaft member 127a formed on the first spring-engaged lever 127, and is inserted into the axially extending groove 132, thereby effecting the joint rotation of the push lever-fitting shaft 123 and first spring-engaged lever 127. The first spring-engaged lever 127 comprises a vertical portion 127b and a horizontal portion 127c and takes a substantially overturned L-shape. One end of the push lever spring 119 is connected to the vertical portion 127b of the first spring-engaged lever 127. Said push lever spring 119 normally urges the first spring-engaged lever 127 for clockwise rotation under the condition of FIGS. 16 and 17. Therefore, the push lever 60 is urged to be rotated up to a position indicated in 2 dots-dash lines. The outer end of the horizontal section 127c extending rearward of the first spring-engaged lever 127 is bent outward of the right frame 21 at right angles to the body of said horizontal section 127c. A pressure-transmitting plane 135 constituted by the underside of the free end portion of the second spring-engaged lever 128 is pressed against a pressure-receiving plane 134 constituted by the upper edge of the rectangularly bent part of the horizontal section 127c of the first spring-engaged lever 127.

A driven shaft 136 (FIG. 16) is disposed above the push lever-fitting shaft 123 is parallel relationship therewith. The driven shaft 136 is rotatably fitted to the right frame 21 and a subframe 137 fitted thereto in parallel by means of a bush 139 engaged with a hole 138 formed in the right frame 21 and subframe 137. Mounted on the driven shaft 136 are the upper sprocket 26, hub 140 and anomalous gearwheel 141 engaged with the gearwheel 129 in the order mentioned as counted from the outer wall of the right frame 21 (FIG. 16). The upper sprocket 26 and hub 140 are fixed to the driven shaft 136 by means of the pin 133. A motive force-transmitting coil spring 142 is fitted around the outer peripheral wall of the hub 140. One end 142a of the motive force-transmitting coil spring 142 is engaged with the underside of an engagement pawl 143 integrally formed with the subframe 137. The other end 142b of the motive force-transmitting coil spring 142 is always fitted into an engagement groove 144 formed in the anomalous gearwheel 141. The second spring-engaged lever 128 is normally urged to regain a prescribed position by a return spring 145.

The push lever spring 119 has its tension controlled by a tension-adjusting mechanism 146. This tension-adjusting mechanism 146 is fixed to the right frame 21, and comprises a guide shaft 147 concurrently acting as a fitting shaft for the subframe 137, a movable guide block 148 slidably set in place by means of the guide shaft 147, a coupling member 148 which is supported by the movable guide block 148 and with which the other end of the push lever spring 119 is engaged, and an adjustment screw 150 which is threadedly inserted into the movable guide block 148, and whose inner end face is pressed against the outer peripheral wall of the guide shaft 147. The movable guide block 148 is retracted when the adjustment screw 150 is tightened and advanced when said adjustment screw 150 is loosened, thereby controlling the tension of the push lever spring 119.

Figure 18A:
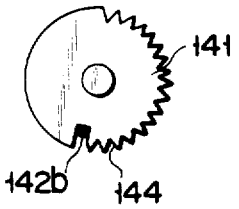
FIGS. 18A and 18B are front views showing the relative positions of the anomalous gear of FIG. 16 and a drive transmission spring.
Figure 18B:
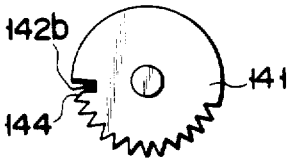

In other words, when the lower copy sheet rest means 13 is brought down about 12 mm (in about one second), then the sprocket 26, hub 140 and driven shaft 136 are rotated clockwise. At this time, the motive force-transmitting spring 142 presses the hub 140 by a frictional force. Therefore, the drive of the hub 140 is transmitted to the anomalous gearwheel 141 by means of the motive force-transmitting spring 142. The transmission of the motive force is continued, until the engagement end 142a of the motive force-transmitting spring 142 is pressed against the engagement pawl 143 to release the tightening force (FIG. 16). The motive force of the anomalous gearwheel 141 is transmitted to the gearwheel 129 engaged with said anomalous gearwheel 141. The second spring-engaged lever 128 integrally formed with the gearwheel 129 is rotated counterclockwise against the urging force of the return spring 145. Therefore, the pressure-transmitting plane 135 of the second spring-engaged lever 128 presses the pressure-receiving plane 134 of the first spring-engaged lever 127. As a result, the first spring-engaged lever 127 is rotated counterclockwise against the urging force of the push lever spring 119 from the solid line position of FIG. 17 to a position indicated in two dots-dash lines. The push lever 60 integrally formed with the first spring-engaged lever 127 is rotated from the two dots-dash line position of FIG. 16 to the solid line position thereof, namely from the solid line position of FIG. 14 to the two dots-dash line position to remove the copy sheet-feeding cassette 15. When the tightening force of the motive force-transmitting spring 142 is released, then the sprocket 26, hub 140 and driven shaft 136 alone are rotated. At this time, the other end engagement section 142b (FIG. 16) engaged with the engagement groove 144 of the anomalous gearwheel 141 is shifted from a position shown in FIG. 18A to a position indicated in FIG. 18B.

Where the lower copy sheet rest means 13 is lifted when the copy sheet cover 9 is closed, then the upper sprocket 26, hub 140 and driven shaft 136 are rotated counterclockwise of FIG. 16 by the run of the right side endless chain 30 in the direction of a broken line arrow indicated in FIG. 16. At the above-mentioned counterclockwise run, the motive force-transmitting spring 142 and anomalous gearwheel 141 are jointly rotated counterclockwise. Where the other end engagement section 142b of the motive force-transmitting spring 142 is shifted from a position shown in FIG. 18B to a position indicated in FIG. 18A, then a frictional force ceases to take place between the motive force-transmitting spring 142 and hub 140. Accordingly, the hub 140, upper sprocket 26 and driven shaft 136 alone are rotated. The anomalous gearwheel 141 and gearwheel 129 engaged therewith cease to be rotated. As a result, the second spring-engaged lever 128 integrally formed with the gearwheel 129 and the first spring-engaged lever 127 are rotated from a position shown in two dots-dash line in FIG. 17 to a solid line position indicated therein. The push lever 60 integrally formed with the first spring-engaged lever 127 is rotated from the one dot-dash line position of FIG. 16 to the solid line position indicated therein, namely, from the solid line position shown in FIG. 14 to the two dots-dash line position indicated therein. Therefore, the push lever lifts the copy sheet support board 118 without shaking it, thereby enabling copy sheets to be supplied from the cassette 15 to a copying press (not shown).

The mechanism 39 for detecting the lowermost position of the lower copy sheet rest means 13 comprises a pin 151 provided in the left side rear part of said copy sheet rest means 13, and a lowermost position-detecting switch 152 whose actuator 152a is set in the traveling course of the pin 151 at a point capable of detecting the prescribed lowermost position of the copy sheet rest means 13.

Description is now given chiefly with reference to FIG. 3 of the operation of a copy sheet-feeding apparatus embodying this invention. Where the copy sheet cover 9 shown in FIGS. 1 and 2 is closed, then the switch 18 for detecting the open state of the copy sheet cover 9 is rendered conducting, thereby effecting the drive of the reversible motor 34 of the chain drive device 38 of the mechanism 41 for actuating the lower copy sheet rest means 13. Where the right and left endless chains 30, 29 run in the normal direction (the direction of a solid line arrow indicated in FIG. 3) then the lower copy sheet rest means 13 is lifted. Where the uppermost copy sheet $P_1$ of a stack mounted on said rest means 13 pushes the detection lever 108 (FIG. 9), then the copy sheet detection switch 113 is rendered conducting to generate a signal denoting the presence of copy sheets on the copy sheet rest means 13. Where the lower copy sheet rest means 13 is further lifted to push the copy sheet-feeding rollers 85 of the right and left copy sheet-feeding roller units 70, 72, then the uppermost position-detecting switch 91 of the uppermost position-detecting mechanism 40 is rendered conducting to stop the drive of the reversible motor 34, and consequently the lifting of the copy sheet rest means 13, thereby rendering an elevator type copy sheet-feeding mechanism 11 ready to supply a copy sheet to a copying press (not shown).

Figure 14:
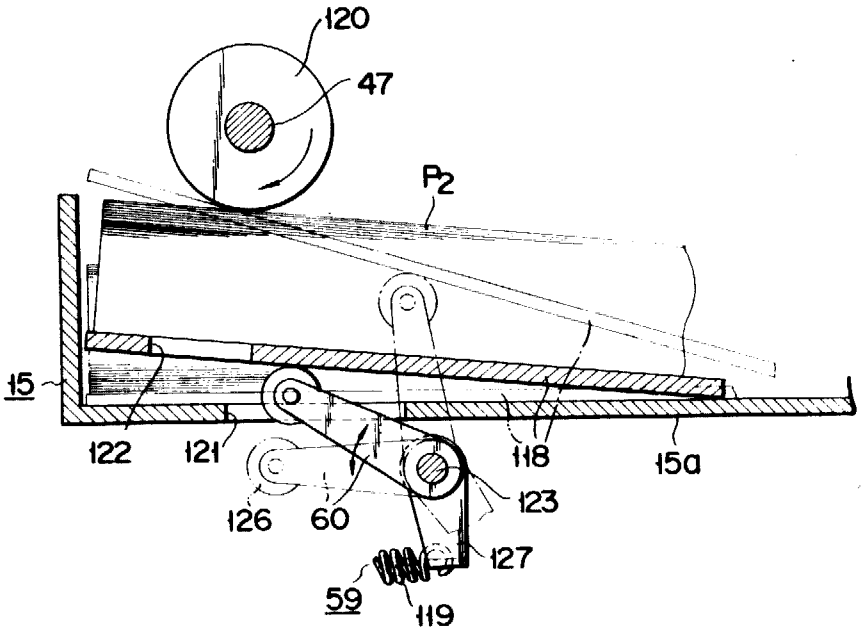
FIG. 14 is a side view showing, partly in section, the relative positions of the copy sheet cassette set in the upper section of the copy sheet-feeding apparatus and a lever for lifting a copy sheet support board.

The rise of the lower copy sheet rest means 13 also causes the copy sheet stack support board 118 of the copy sheet cassette 15 of the cassette type copy sheet-feeding mechanism 12 to be pushed by the push lever 60 (FIG. 14).

Where the print button 3 of FIG. 1 is pushed under the condition in which an instruction is already given to specify the supply of copy sheets stacked on the tray of the lower elevator type copy sheet rest means 13, then the drive sprocket 52 (FIG. 3) is actuated. At this time, the first electromagnetic clutch 53 is rendered conducting, causing the drive of the endless chain 51 to be transmitted to the drive shaft 46 of the uppermost copy sheet-picking up mechanism 42 for the lower copy sheet rest means 13. As a result, the uppermost copy sheet $P_1$ of a stack mounted on said rest means 13 is taken out of the stack by the rotation of the copy sheet-feeding roller 85 and conducted to that side of the copy sheet-feeding apparatus on which the timing-adjusting restart copy sheet-feeding roller 44 is set. Thereafter the third electromagnetic clutch 57 is actuated in proper timing, causing said timing-adjusting restart copy sheet-feeding roller 44 to be rotated for the supply of a copy sheet to the copying press.

Where the copy sheet-feeding roller 85 is progressively brought down as copy sheets are removed from a stack one after another, starting with the uppermost one, then the uppermost position-detecting switch 91 of the uppermost position-detecting mechanism 40 is rendered nonconducting. As a result, the lower copy sheet rest means 13 is lifted in a prescribed stepwise mode. This stepwise or intermittent lifting of the copy sheet rest means 13 enables the uppermost copy sheet of a stack to be always set in a position falling within a prescribed range in which an electrostatic image of the original material never fails to be impressed on the copy sheet. Where all the copy sheets $P_1$ of a stack have been supplied to a copying press, then the detection part 108a of the detection lever 108 of the paper-detecting mechanism 61 is allowed to fall, as shown in FIG. 10A, into the detection part fall hole 109 of the tray 94 or 95 of the lower copy sheet rest means 13. As a result, the copy sheet-detecting switch 113 is rendered nonconducting. At this time, the display section 5 of the control panel 6 indicates the absence of copy sheets.

Where the print button 3 of the copying press 1 of FIG. 1 is pushed under the condition in which an instruction is already given to specify the supply to the copying press of copy sheets $P_2$ received in the cassette type copy sheet-feeding mechanism 12, then the drive sprocket 52 is actuated. At this time the second magnetic clutch 54 of the copy sheet feeding roller-driving mechanism 45 is actuated, causing the drive of the endless chain 51 to be transmitted to the drive shaft 47 of the uppermost copy sheet-picking up mechanism 43 for the upper cassette type copy sheet-feeding mechanism 12. As a result, the uppermost copy sheet $P_2$ of a stack received in the cassette type copy sheet-feeding mechanism 12 is picked up by the rotation of the copy sheet-feeding roller 120, and then conducted to that side of the copy sheet-feeding apparatus on which the timing-adjusting restart copy sheet-feeding roller 44 is provided. When the third electromagnetic clutch 57 is actuated in proper timing for the rotation of the timing-adjusting restart copy sheet-feeding roller 44, then the copy sheet is supplied to the copying press. When the cassette 15 is cleared of all copy sheets, then the detection part 114a of the detection lever 114 of the copy sheet-detecting mechanism 62 is allowed to fall, as shown in FIG. 13, into the detection part fall hole 122 formed in the copy sheet stack support board 118 (FIG. 14). As a result, the copy sheet-detecting switch 117 is rendered non-conducting. The display section 5 of the control panel of FIG. 1 indicates the absence of copy sheets.

When the absence of copy sheets is indicated in the display section 5, then the operator opens the copy sheet cover 9 for the supply of a fresh stack of copy sheets $P_1$ or $P_2$ to the lower copy sheet rest means 13 or cassette type copy sheet-feeding mechanism 12. Where the copy sheet cover 9 is opened, the switch 18 for detecting the open and closed states of the copy sheet cover 9 is rendered nonconducting. As a result, the reversible motor 34 of the chain-driving mechanism 38 of the copy sheet rest means-actuating mechanism 41 is driven backward, causing the right and left endless chains 30, 29 to run backward in the direction of a broken line arrow indicated in FIG. 3 for the lowering of, for example, the lower copy sheet rest means 13. When the actuator 152a of the lowermost position-detecting switch 152 is pushed by the pin 151 integrally formed with the lower copy sheet rest means 13, then the reversible motor 34 stops its run, causing the copy sheet rest means 13 to stand still in the allowable lowermost position. On the other hand, where the lower copy sheet rest means 13 is brought down, then the push lever 60 for lifting the copy sheet stack support board 118 (FIG. 14) of the copy sheet-feeding cassette 15 is rotated to the two dots-dash line position for the removal of the copy sheet-feeding cassette 15.

Where the used cassette 15 is taken out, a stack of fresh copy sheets is supplied to the lower copy sheet rest means 13 or some additional copy sheets are supplied to a stack still mounted on the copy sheet rest means 13. Or fresh copy sheets having different sizes from those already impressed are supplied to the cassette 15 thus taken out. Or where necessary, the cassette 15 itself maybe replaced by one having a different size in anticipation of the different sizes of fresh copy sheets which will be used in any of the following copying cycles. Later when the copy sheet cover 9 is closed, all automatically becomes ready for the immediately succeeding copying operation.

Where it is attempted to supply additional copy sheets $P_1$, as shown in FIG. 11, to a stack still mounted on the lower copy sheet rest means 13, then the stopper section 108c of the detection lever 108 of the copy sheet-detecting mechanism 61 physically prevents those of additionally supplied copy sheets whose stacked height would rise above the upper limit height $h_1$ of a normal stack of copy sheets from being superposed on the stack already placed on said copy sheet rest means 13.

Figure 6A:
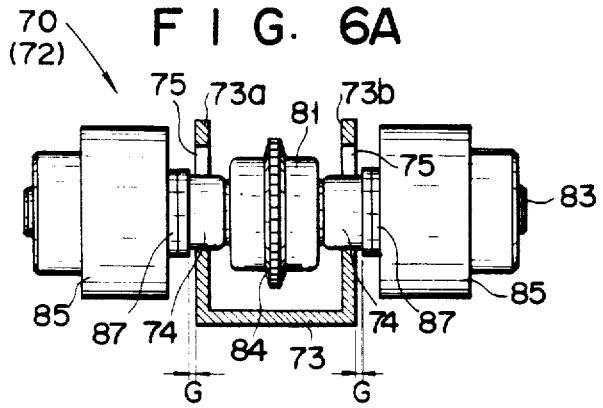
FIGS. 6A and 6B are front views, partly in section, of a copy sheet roller assembly fitted to an arm.
Figure 6B:
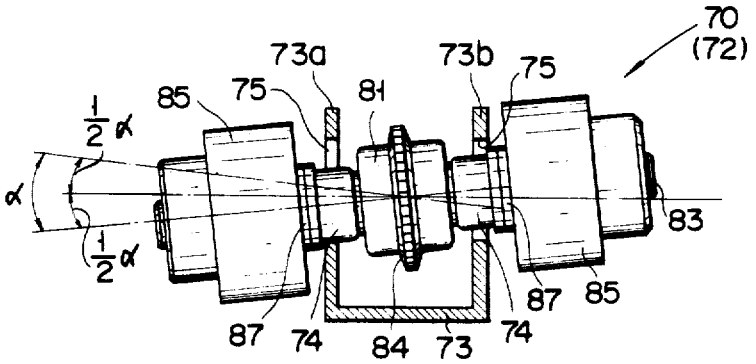
Figure 19A:
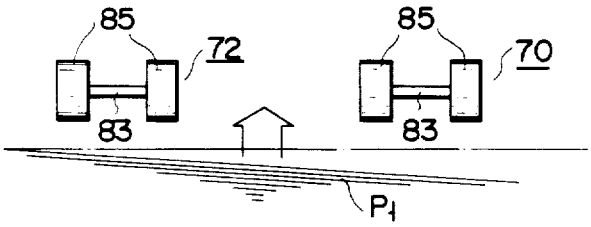
FIGS. 19A to 19E are front views showing the relative positions of a pair of copy sheet rollers and the uppermost copy sheet of a stack to be contacted by said copy sheet rollers.
Figure 19B:
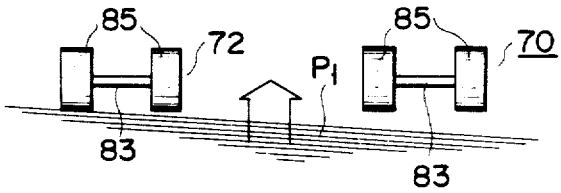
Figure 19C:
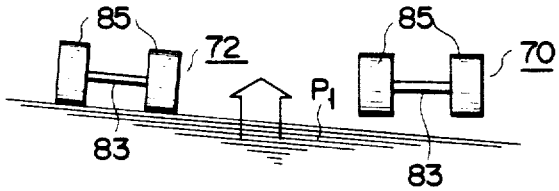
Figure 19D:
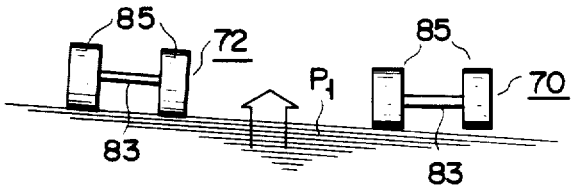
Figure 19E:
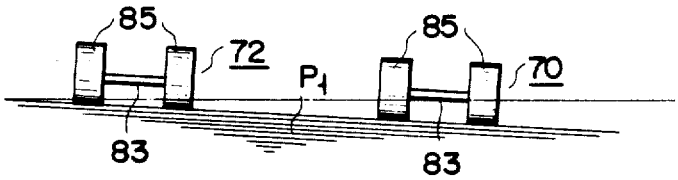

As seen from FIGS. 6A and 6B, the right and left copy sheet-feeding roller units 70, 72 of the uppermost copy sheet-picking up mechanism 42 for the lower copy sheet rest means 13 are each vertically movable relative to the arm 73 and also can be rotated about the lengthwise center of the copy sheet-feeding roller shaft 83 relative to said arm 73. Therefore, no matter how the uppermost copy sheet of a stack is positioned relative to a horizontal plane, namely whether the right or left side of the uppermost copy sheet is displaced, for example, downward from said horizontal plane, as shown in FIGS. 19A to 19D, the copy sheet-feeding roller units 70, 72 never fail to be eventually pressed against the surface of the uppermost copy sheet as seen from FIG. 19E, thereby enabling the uppermost copy sheet to be reliably carried forward to the copying press with a uniform pressure.

What is claimed is:

1. A sheet feeding apparatus comprising:

first sheet-holding means having a sheet rest for supporting a stack of sheets which sheet rest is movable up and down between a sheet replenishing position and a sheet supply position;

second sheet-holding means having a cassette for supporting a stack of sheets and which is movable between a sheet replenishing position and a sheet supply position;

a sheet cover movable between a closed position at which it covers [both] the first [and second] sheet-holding means and an open position at which [both of] said first [and second] sheet-holding means [are] *is* exposed;

a first drive mechanism for driving the first sheet-holding means between the sheet replenishing position and the sheet supply position;

a detection mechanism for detecting the open position and the closed position of the cover and for supplying to the first drive mechanism an open signal when the cover is open and a closed signal when the cover is closed, the first drive mechanism causing the sheet rest to (a) move from the sheet supply position to the sheet replenishing position in response to the open signal and (b) move from the sheet-replenishing position to the sheet supply position in response to the closed signal; and a second drive mechanism for causing the cassette to (a) move from the sheet supply position to the sheet replenishing position in response to the movement of the sheet rest from its sheet supply position to its sheet replenishing position and (b) move from the sheet replenishing position to the sheet supply position in response to the movement of the sheet rest from its sheet replenishing position to its supply position.

2. A sheet feeding apparatus according to claim 1, wherein said second sheet-holding means includes a cassette rest fixedly mounted such that the cassette is removably placed thereon, the cassette including a case body and a paper support plate rotatably mounted within the case body to support the front portions of the sheets, the paper support plate being rotatable by the second drive mechanism between the sheet replenishing position and the sheet supply position.

3. A sheet feeding apparatus according to claim 2, wherein said second drive mechanism includes a push-up lever mounted such that it is rotatable and engageable with the paper support plate, and a push-up lever operating mechanism for causing the push-up lever to rotate the paper support plate between the sheet replenishing position and the sheet supply position by a drive force for causing the first drive mechanism to move the sheet rest from the sheet replenishing position to the sheet supply position.

4. A sheet feeding apparatus according to claim 3, wherein said first sheet-holding means is disposed below the second sheet-holding means and the cassette and which, when at the sheet replenishing position, is positioned such that it can be removed from the cassette rest.

5. A sheet feeding apparatus according to claim 1, 2, 3 or 4, wherein said first sheet-holding means includes a replenishing amount restricting member.

6. A sheet-feeding apparatus according to claim 5, wherein the sheet rest has a slit in a portion thereof adapted to receive a stack of sheets, and which further comprises a mechanism for detecting the presence of sheets on the sheet rest or the absence of sheets therefrom, the sheet-detecting mechanism including a detection lever which is moved to a first position capable of abutting against the uppermost sheet of a stack when the stack is mounted on the sheet rest, and, at the absence of any sheet, is moved to a second position in which said detection lever is allowed to fall into the slit formed in the sheet rest and a sheet-detecting switch for generating (a) a signal indicating the presence of a sheet when the detection lever is in said first position, and (b) a signal indicating the absence of a sheet when the detection lever is in said second position, the replenishing amount restricting member being provided on the forward end of the detection lever.

* * * * *